United States Patent
Kuntz et al.

(10) Patent No.: US 9,957,407 B2
(45) Date of Patent: May 1, 2018

(54) USE OF A POLYMER DISPERSION FOR COLD SEALING

(71) Applicant: BASF SE

(72) Inventors: Andrea Kuntz, Heidelberg (DE); Karl-Heinz Schumacher, Neustadt (DE); Christoph Kiener, Weisenheim am Sand (DE)

(73) Assignee: BASF SE, Ludwigshafen (DE)

( * ) Notice: Subject to any disclaimer, the term of this patent is extended or adjusted under 35 U.S.C. 154(b) by 64 days.

(21) Appl. No.: 14/766,807

(22) PCT Filed: Mar. 17, 2014

(86) PCT No.: PCT/EP2014/055225
§ 371 (c)(1),
(2) Date: Aug. 10, 2015

(87) PCT Pub. No.: WO2014/154507
PCT Pub. Date: Oct. 2, 2014

(65) Prior Publication Data
US 2016/0002486 A1      Jan. 7, 2016

(30) Foreign Application Priority Data
Mar. 26, 2013 (EP) ..................................... 13161125

(51) Int. Cl.
| | | |
|---|---|---|
| C09D 133/14 | (2006.01) |
| B05D 3/00 | (2006.01) |
| C08F 2/20 | (2006.01) |
| C08F 2/24 | (2006.01) |
| C09J 133/14 | (2006.01) |
| C09J 7/02 | (2006.01) |

(52) U.S. Cl.
CPC ........... *C09D 133/14* (2013.01); *B05D 3/007* (2013.01); *C08F 2/20* (2013.01); *C08F 2/24* (2013.01); *C09J 7/02* (2013.01); *C09J 133/14* (2013.01)

(58) Field of Classification Search
CPC ...... C09J 133/10; B65D 75/58; C09D 133/14; B05D 3/00
USPC ......................................................... 524/548
See application file for complete search history.

(56) References Cited

U.S. PATENT DOCUMENTS

| | | | |
|---|---|---|---|
| 5,908,908 A | 6/1999 | Vanhoye et al. | |
| 2011/0152052 A1* | 6/2011 | Schumacher | C09D 133/08 493/265 |

FOREIGN PATENT DOCUMENTS

WO    WO 2011/073221 A2    6/2011

OTHER PUBLICATIONS

International Search Report dated May 21, 2014 in PCT/EP2014/055225 (with English language translation).
Houben-Weyl, "Methoden der Organischen Chemie" Band XIV/2 Makromolekulare Stoffe, Teil 2, Georg Thieme Verlag, Stuttgart, 1963, 13 Pages.
"Bulletin of the American Physical Society" Programme of the 1956 Annual Meeting, Columbia University, New York, Series II, vol. 1, No. 1, Jan. 30, 1956, p. 123 (with Cover Page).
"Polyacryl-Verbindungen bis Quecksilber" Ullmanns Encyklopädie der technischen Chemie 4, Band 19, 1980, pp. 18-21, (with Cover Page).
"Plastics, Properties and Testing to Polyvinyl Compounds" Ullmann's Encyclopedia of Industrial Chemistry, vol. A 21, Fifth, Completely Revised Edition, 1992, pp. 157-178 (with Cover Page).

* cited by examiner

*Primary Examiner* — Deve E Valdez
(74) *Attorney, Agent, or Firm* — Oblon, McClelland, Maier & Neustadt, L.L.P.

(57) ABSTRACT

A description is given of the use of a polymer dispersion for cold sealing, the polymer dispersion comprising a polymer in dispersion in water and having a glass transition temperature in the range from −20 to +10° C., said polymer being preparable by emulsion polymerization of radically polymerizable monomers in the presence of at least one polymeric protective colloid, and the polymer being formed to an extent of 0.05 to less than 1 wt % of a monomer M, selected from the group consisting of (meth)acrylate monomers having a substituent of the formula

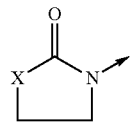

where X is $CH_2$, O, NH or NR, and R is a C1 to C4 alkyl group.

Descriptions are also given of a method for producing cold-sealed packaging, and of the packaging obtainable by said method.

21 Claims, No Drawings

USE OF A POLYMER DISPERSION FOR COLD SEALING

The invention relates to the use of a polymer dispersion for cold sealing, the polymer dispersion comprising a polymer in dispersion in water and having a glass transition temperature in the range from −20 to +10° C., said polymer being preparable by emulsion polymerization of monomers in the presence of at least one polymeric protective colloid, and the polymer being formed to an extent of 0.05 to less than 1 wt % of a monomer M, selected from the group consisting of (meth)acrylate monomers having a substituent of the formula

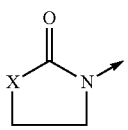

where X is $CH_2$, O, NH, or NR, and R is a C1 to C4 alkyl group. The invention also relates to a method for producing cold-sealed packaging, and to the packaging obtainable by said method.

Cold sealable compositions are bonding agents which, following application to and drying on a substrate, are not tacky to the touch, yet adhere to one another when pressed against one another at room temperature with pressure. They differ from pressure-sensitive adhesives in their absence of tack, or at most very low tack, at room temperature. They differ from heat sealable compositions in that they can be bonded to one another under pressure without heat activation. Known applications of cold sealable compositions include, for example, the closing of pouchlike packs, especially for foods or other heat-sensitive goods in whose packaging the application of heat is undesirable, such as ice cream or chocolate, for example, or when fast packing speeds and high cycle rates are required. On account of their nontacky qualities, substrates coated with them can be rolled up into rolls and stored prior to application, without adhering to the opposite, other side of the support substrate, the side preferably carrying a release coating. Polymer dispersions based on natural rubber latex are typically used for cold seal adhesives. Disadvantages associated with natural rubber latex are a comparatively high price volatility, natural fluctuations in the quality of the natural raw material, and, in particular, the allergenic potential harbored by these natural products.

WO 2011/073221 A2 describes cold sealed, reclosable packaging. An emulsion polymer is used in that case that has been prepared in the presence of a protective colloid.

Sealing dispersions are typically employed by application to a film and drying. Thereafter the adhesive-coated film is rolled up and stored in some cases for months. In the course of this storage, high pressures are active. It has been found that the active pressure during storage alters the adhesive, with the sealed seam strength of coated films after pressure storage being markedly less than that prior to pressure storage.

An object was to provide further compositions for cold sealing, the compositions being very largely devoid of allergenic potential and free of organic solvents, in other words being aqueous dispersions of polymers, and containing as little emulsifier as possible, or none, and forming a cold-sealable coating after drying. A particular object was that the compositions after cold sealing should have very high sealed seam strengths, not least after pressure storage of coated films. Furthermore, the compositions ought to be able to be applied very effectively by customary application technologies (such as printing, for example), especially to film substrates.

The object is achieved in accordance with the invention through the use of a polymer dispersion for cold sealing, the polymer dispersion comprising at least one polymer which is present in dispersion in water and is preparable by emulsion polymerization of radically polymerizable monomers in the presence of at least one polymeric protective colloid (also called emulsion polymer below),
the polymer having a calculated glass transition temperature in the range from −20 to +10° C. and the polymer being formed to an extent of 0.05 to less than 1 wt %, preferably 0.07 to 0.8 wt %, of at least one monomer M selected from the group consisting of (meth)acrylate monomers having a substituent of the formula

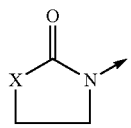

where X is $CH_2$, O, NH, or NR, and R is a C1 to C4 alkyl group.

Cold sealing can be accomplished by the coating of a suitable substrate, such as a packaging substrate, with a composition comprising the emulsion polymer, in the form of an aqueous polymer dispersion, followed by drying and subsequent sealing at temperatures of, for example, not more than 40° C. or not more than 30° C.

The polymer dispersion can be used as a cold seal adhesive. Preference is given in that case to the use, as well as of unfunctionalized alkyl (meth)acrylate monomers such as ethyl acrylate, for example, of a functional monomer with a ureido group, an example being ureidoethyl methacrylate (also called UMA or ureidomethacrylate), preferably in combination with vinyl ester monomers, such as vinyl acetate, for example. In this way a significant increase in the sealed seam strength can be achieved.

Whereas customary, protective colloid-stabilized polymer dispersions used as raw materials for cold seal adhesives have sealed seam strengths of 4-5 N/15 mm, it is possible for the use of just 1 pphm (part per hundred monomers) of UMA (preferably in 25% strength form in methyl methacrylate) to raise the sealed seam strength to, for example, up to 7 N/15 mm.

Cold sealable means that when two surfaces coated with a composition of the invention and dried are contacted with exertion of pressure at temperatures less than 40° C., more particularly less than 30° C. or less than 25° C., more particularly at room temperature (20° C.), they adhere to one another. The adhesion (autoadhesion) after sealing at 20° C. and 1.4 bar is preferably at least 2 N/15 mm (initial opening force), measured according to the method described in the examples for determining the sealed seam strength. In practical application, cold sealing takes place usefully at ambient temperature, in other words, in general, at temperatures of 10 to 30° C., more particularly 15 to 25° C., and under pressures of a few millibar to several bar above atmospheric pressure (1 bar), as for example at 0.01 to 5 bar, more particularly from 0.1 to 3 bar above atmospheric pressure. The sealing time, i.e., the time during which the pressure is maintained, amounts for example to 0.1 to 20 seconds, more particularly 0.1 to 3 seconds, with 0.5 second being customary in particular.

Following application to a substrate and drying, the polymer dispersions of the invention form a coating which is preferably autoadhesive and blocking-resistant with respect to polyamide release coatings. Autoadhesive means that two coated surfaces are cold sealable to one another. The autoadhesion of the layer of adhesive after cold sealing at 20° C. and 1.4 bar is preferably at least 2 N/15 mm. Blocking resistant means that the adhesion of a surface coated with a composition of the invention and dried, i.e., the adhesion with an unsealed layer of adhesive, relative to a polyamide release coating, after loading of a circular surface with a diameter of 10 cm with 10 tonnes for one day at 20° C., is not more than 0.1 N/25 mm, measured by the method described in the examples.

Preferred packaging, coated films, and compositions have or produce an initial opening force (sealed seam strength) of at least 2 N/15 mm and a blocking resistance of the cold seal coating with respect to a polyamide release coating of preferably not more than 0.1 N/25 mm, in each case measured by the methods described in the examples.

The polymer dispersions of the invention are dispersions of polymers in an aqueous medium. The aqueous medium may for example comprise fully demineralized water or else mixtures of water and a water-miscible solvent such as methanol, ethanol, or tetrahydrofuran. Preferably no organic solvents are used. The solids contents of the dispersions are preferably from 15 to 75 wt %, more preferably from 40 to 60 wt %, more particularly greater than 50 wt %. The solids content may be adjusted for example through appropriate adjustment of the amounts of monomer and/or of the amount of water used for the emulsion polymerization. The average particle size of the polymer particles dispersed in the aqueous dispersion is preferably less than 400 nm, more particularly less than 300 nm. With particular preference the average particle sized is between 140 and 280 nm. By average particle size is meant here the $d_{50}$ of the particle size distribution—that is, 50 wt % of the total mass of all particles have a smaller particle diameter than the $d_{50}$. The particle size distribution can be determined in a known way using an analytical ultracentrifuge (W. Mächtle, Makromolekulare Chemie 185 (1984), pages 1025-1039). The pH of the polymer dispersion is adjusted preferably to more than 4 and more particularly to a pH of between 5 and 9.

The composition may for the purposes of the inventive use consist solely of the protective colloid and the polymer in dispersion in water. It may, however, also include further adjuvants, examples being fillers, antiblocking agents, dyes, flow control agents, or thickeners.

The polymer dispersions of the invention preferably have a low emulsifier content, meaning that they contain emulsifiers (the nonpolymeric, amphiphilic, surface-active substances added to the polymerization mixture) in an amount of preferably less than 3 or less than 1 wt %. Emulsifier-free systems are particularly preferred. In one embodiment of the invention, therefore, the emulsion polymerization carried out in the presence of the protective colloid takes place in emulsifier-free form, i.e., without addition of emulsifiers.

In the text below, the designation "(meth)acryl . . . " and similar designations are used as an abbreviated notation for "acryl . . . or methacryl . . . ".

Protective colloids are polymeric compounds which, on solvation, bind large quantities of water and are capable of stabilizing dispersions of water-insoluble polymers. In contrast to emulsifiers, they generally do not lower the interfacial tension between polymer articles and water. The number-average molecular weight of the protective colloids is preferably above 1000 g/mol, more particularly above 2000 g/mol, and more preferably up to 50 000 g/mol or up to 10 000 g/mol, as for example from 1000 to 100 000 g/mol, from 1000 to 10 000 g/mol, or from 2000 to 10 000 g/mol.

The protective colloids are preferably water-soluble—that is, they are soluble in water to an extent of at least 10 g/l at 23° C. and at a pH>5.5.

The protective colloids are used preferably in an amount of 0.5 to 60 parts by weight or of 1 to 30 parts by weight, more preferably of 7 to 30 parts by weight (especially if the total solids content of the composition of the invention is more than 50 wt %), based on 100 parts by weight of the monomers to be polymerized. A comprehensive description of protective colloids is found in Houben-Weyl, Methoden der organischen Chemie, volume XIV/1, Makromolekulare Stoffe [Macromolecular compounds], Georg Thieme Verlag, Stuttgart, 1961, pages 411 to 420. Protective colloids contemplated include, for example, amphiphilic polymers, these being polymers having hydrophobic and hydrophilic groups. They may be natural polymers, such as starch, or synthetic polymers.

The protective colloid is preferably formed from at least 40 wt % of nonionic principal monomers, defined in more detail below, and also from a second kind of monomer, selected from ethylenically unsaturated acid monomers. The protective colloid may, furthermore, be formed optionally from additional, preferably nonionic, monomers. The protective colloid is composed preferably to an extent of at least 40 wt %, more particularly from 40 to 80 wt % or from 50 to 80 wt %, of principal monomers selected from the group consisting of C1 to C20 alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, and mixtures of these monomers.

Principal monomers for the protective colloid are, for example, (meth)acrylic acid alkyl esters with a $C_1$-$C_{10}$ alkyl radical, such as methyl methacrylate, methyl acrylate, n-butyl acrylate, ethyl acrylate, and 2-ethylhexyl acrylate. Also suitable in particular are mixtures of the (meth)acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Suitable vinylaromatic compounds include vinyltoluene, alpha- and para-methylstyrene, alpha-butylstyrene, 4-n-butylstyrene, 4-n-decylstyrene, and—preferably—styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether or vinyl isobutyl ether. Vinyl ethers of alcohols comprising 1 to 4 C atoms are preferred. Hydrocarbons having 4 to 8 C atoms and two olefinic double bonds include butadiene, isoprene, and chloroprene. Preferred principal monomers for the protective colloid are the $C_1$ to $C_{10}$ alkyl acrylates and methacrylates, more particularly $C_1$ to $C_8$ alkyl acrylates and methacrylates, and vinylaromatics, especially styrene and alpha-methylstyrene, and mixtures thereof. Very particular preference is given to methyl acrylate, methyl methacrylate, ethyl acrylate, n-butyl acrylate, n-butyl methacrylate, n-hexyl acrylate, octyl acrylate, 2-ethylhexyl acrylate, 2-propylheptyl acrylate, styrene, alpha-methylstyrene, and mixtures of these monomers.

The protective colloid is further composed preferably to an extent of at least 15 wt %, more particularly from 15 to 60 wt % or from 20 to 50 wt %, of ethylenically unsaturated acid monomers. Ethylenically unsaturated acid monomers are, for example, ethylenically unsaturated carboxylic acids, ethylenically unsaturated sulfonic acids, and vinylphosphonic acid. Ethylenically unsaturated carboxylic acids used are preferably alpha,beta-monoethylenically unsaturated monocarboxylic and dicarboxylic acids having 3 to 6 C atoms in the molecule. Examples thereof are acrylic acid, methacrylic acid, itaconic acid, maleic acid, fumaric acid, crotonic acid, vinylacetic acid, and vinyllactic acid. Suitable ethylenically unsaturated sulfonic acids include, for example, vinylsulfonic acid, styrenesulfonic acid, acrylamidomethylpropanesulfonic acid, sulfopropyl acrylate, and sulfopropyl methacrylate. Preference is given to acrylic acid and methacrylic acid and a mixture thereof, particular preference to acrylic acid. The acid monomers can be used in the form of the free acids and also in a form partially or fully neutralized with suitable bases, for the polymerization. It is preferred to use aqueous sodium or potassium hydroxide solution or ammonia as neutralizing agent.

The protective colloid is preferably composed to an extent of 50 to 80 wt % of C2 to C10 alkyl (meth)acrylates and to an extent of 20 to 50 wt % of (meth)acrylic acid, and preferably of no further monomers.

In one preferred embodiment a protective colloid
(i) is used in an amount of 7 to 30 parts by weight, based on 100 parts by weight of the monomers to be polymerized,
(ii) is composed to an extent of at least 40 wt % of principal monomers selected from the group consisting of C1 to C20 alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, and mixtures of these monomers,
(iii) is composed to an extent of at least 15 wt % of ethylenically unsaturated acid monomers preferably selected from acrylic acid, methacrylic acid, and a mixture thereof, and
(iv) has a number-average molecular weight of 1000 to 10 000.

The active substance that functions as binder for the cold sealing of the layer of adhesive is the emulsion polymer preparable by emulsion polymerization of radically polymerizable monomers, referred to below as adhesive polymer. The adhesive polymer is composed preferably to an extent of at least 60 wt %, more preferably to an extent of at least 80 wt %, e.g., from 80 to 99.5 wt %, more preferably to an extent of at least 90 wt %, of one or more of the principal monomers described below. The principal monomers are selected from the group consisting of $C_1$-$C_{20}$ alkyl (meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers.

Examples include (meth)acrylic acid alkyl esters with a $C_1$-$C_{10}$ alkyl radical, such as methyl methacrylate, methyl acrylate, n-butyl acrylate, ethyl acrylate, and 2-ethylhexyl acrylate. Also suitable in particular are mixtures of the (meth)acrylic acid alkyl esters. Vinyl esters of carboxylic acids having 1 to 20 C atoms are, for example, vinyl laurate, vinyl stearate, vinyl propionate, Versatic acid vinyl esters, and vinyl acetate. Suitable vinylaromatic compounds include vinyltoluene, α- and p-methylstyrene, alpha-butylstyrene, 4-n-butylstyrene, 4-n-decylstyrene, and—preferably—styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Vinyl ethers include, for example, vinyl methyl ether or vinyl isobutyl ether. Vinyl ethers of alcohols comprising 1 to 4 C atoms are preferred. Hydrocarbons having 4 to 8 C atoms and two olefinic double bonds include butadiene, isoprene, and chloroprene.

Preferred principal monomers for the adhesive polymer are the $C_1$ to $C_{10}$ alkyl acrylates and methacrylates, more particularly $C_1$ to $C_8$ alkyl acrylates and methacrylates, and vinylaromatics, especially styrene, and mixtures thereof. Very particular preference is given to methyl acrylate, methyl methacrylate, ethyl acrylate, n-butyl acrylate, n-butyl methacrylate, n-hexyl acrylate, octyl acrylate, and 2-ethylhexyl acrylate, 2-propylheptyl acrylate, styrene, and mixtures of these monomers.

Besides the principal monomers, the adhesive polymer may comprise further monomers, examples being monomers with carboxylic acid, sulfonic acid or phosphonic acid groups. Carboxylic acid groups are preferred. Examples include acrylic acid, methacrylic acid, itaconic acid, maleic acid or fumaric acid. Further monomers are, for example, monomers also comprising hydroxyl groups, more particularly $C_1$-$C_{10}$ hydroxyalkyl (meth)acrylates, and also (meth)acrylamide. Further monomers that may additionally be mentioned include phenyloxyethylglycol mono(meth)acrylate, glycidyl acrylate, glycidyl methacrylate, and amino (meth)acrylates such as 2-aminoethyl (meth)acrylate. Further monomers that may be mentioned also include crosslinking monomers.

The adhesive polymer, or the emulsion polymer prepared by emulsion polymerization, is preferably free from acid groups, however.

More particularly the adhesive polymer is composed to an extent of at least 60 wt %, more preferably to an extent of at least 80 wt %, e.g., from 60 to 99.9 wt %, and very preferably at least 95 wt %, of at least one $C_1$ to $C_{20}$ alkyl (meth)acrylate, a mixture thereof, or a mixture thereof with styrene and/or vinyl acetate.

The polymer may be composed for example of
(a) 90 to 99 wt % of at least one first monomer selected from n-butyl acrylate and ethyl acrylate,
(b) 0.1 to 9.9 wt % of at least one second monomer selected from methyl acrylate, methyl methacrylate, vinyl acetate, and styrene,
(c) 0.05 to 0.95 wt % of ureido (meth)acrylate.

In one embodiment the binder is a copolymer of ethyl acrylate, methyl methacrylate, vinyl acetate, and ureidoethyl methacrylate.

The polymer is formed to an extent of 0.05 to less than 1 wt %, preferably 0.07 to 0.8 wt %, based on the total amount of the monomers used for preparing the polymer, of at least one monomer M selected from the group consisting of (meth)acrylate monomers having a substituent of the formula

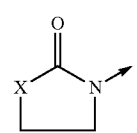

where X is $CH_2$, O, NH, or NR, and R is a C1 to C4 alkyl group. The arrow on the N atom denotes the linkage point of the substituent to the (meth)acrylate monomer. In the case of X as NH or NR, a monomer M has a ureido group. In the case of X as O or $CH_2$, the monomers M are termed monomers having a ureido-analogous group.

Monomers M are, for example, those of the formula

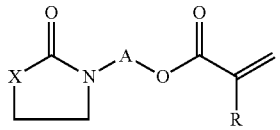

where X is as defined above, R is hydrogen or methyl, and A is a divalent linking group, preferably a C1 to C10 alkyl group or a C2 to C4 alkyl group. Particular preference is given to using ureidoalkyl (meth)acrylates having 1 to 10 C atoms, preferably 2 to 4 C atoms in the alkyl group, more particularly ureidoethyl methacrylate (also identified as ureidomethacrylate or as UMA).

The polymer is preferably formed to an extent of 100% from monomers selected from acrylic esters, methacrylic esters, vinyl esters, styrene, ureido (meth)acrylate, and a mixture thereof, and the protective colloid is preferably (i) used in an amount of 7 to 30 wt %, based on the amount of the polymer,
(ii) and is composed to an extent of at least 40 wt % of principal monomers selected from the group consisting of C1 to C20 alkyl (meth)acrylates, styrene, alpha-methylstyrene, and a mixture thereof, and
(iii) to an extent of at least 15 wt % of ethylenically unsaturated acid monomers preferably selected from acrylic acid, methacrylic acid, and a mixture thereof, and
(iv) has a number-average molecular weight of 1000 to 10 000.

The emulsion polymer prepared in the presence of at least one protective colloid has a calculated glass transition temperature of −20 to +10° C., preferably of −15 to +5° C. The glass transition temperature can be calculated using the Fox equation. According to Fox (T. G. Fox, Bull. Am. Phys. Soc. 1956 [Ser. II] 1, page 123 and in accordance with Ullmann's Encyclopädie der technischen Chemie, volume 19, page 18, 4th edition, Verlag Chemie, Weinheim, 1980) a calculation of the glass transition temperature of copolymers is governed in good approximation by the following relationship:

$$1/T_g = x^1/T_g^1 + x^2/T_g^2 + \ldots x^n/T_g^n,$$

where $x^1, x^2, \ldots x^n$ are the mass fractions of the monomers 1, 2, ..., n and $T_g^1, T_g^2, \ldots T_g^n$ are the glass transition temperatures of the polymers composed in each case of only one of the monomers 1, 2, ... n, in degrees Kelvin. The $T_g$ values for the homopolymers of the majority of monomers are known and are listed in Ullmann's Ecyclopedia of Industrial Chemistry, 5th edition, volume A21, page 169, VCH Weinheim, 1992; other sources of glass transition temperatures of homopolymers include, for example, J. Brandrup, E. H. Immergut, Polymer Handbook, 1$^{st}$ Ed., J. Wiley, New York 1966, 2$^{nd}$ Ed. J. Wiley, New York 1975, and 3rd edition, J. Wiley, New York 1989.

The polymers can be prepared by emulsion polymerization, the product then being an emulsion polymer. The emulsion polymerization is generally carried out using ionic and/or nonionic emulsifiers and/or protective colloids or stabilizers as surface-active compounds, in order to support the dispersing of the monomers in the aqueous medium. In accordance with the invention it is possible to employ one or more of the abovementioned protective colloids as sole dispersant, i.e., without the addition of emulsifiers. If desired, however, small amounts of emulsifiers can also be used as well. The protective colloids are introduced in the initial charge or supplied simultaneously with monomers to the polymerization vessel. They are preferably included in the initial emulsion polymerization charge, while any emulsifiers additionally employed can be supplied in the course of the polymerization together with the monomers as well. The emulsion polymerization preferably takes place in the presence of at least one protective colloid without the addition of a nonpolymeric emulsifier.

If emulsifiers are used as additional surface-active substances, they are preferably anionic or nonionic emulsifiers. Suitable emulsifiers are exemplified by ethoxylated $C_8$ to $C_{36}$ or $C_{12}$ to $C_{18}$ fatty alcohols having a degree of ethoxylation of 3 to 50 or of 4 to 30, ethoxylated mono-, di-, and tri-$C_4$ to $C_{12}$ or $C_4$ to $C_9$ alkylphenols having a degree of ethoxylation of 3 to 50, alkali metal salts of dialkyl esters of sulfosuccinic acid, alkali metal salts and ammonium salts of $C_8$ to $C_{12}$ alkyl sulfates, alkali metal salts and ammonium salts of $C_{12}$ to $C_{18}$ alkylsulfonic acids, and alkali metal salts and ammonium salts of $C_9$ to $C_{18}$ alkylarylsulfonic acids. Cationic emulsifiers are, for example, compounds having at least one amino group or ammonium group and at least one C8-C22 alkyl group. Other suitable emulsifiers are compounds of the general formula

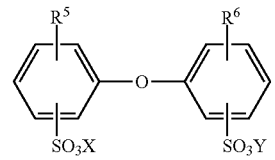

in which $R^5$ and $R^6$ are hydrogen or $C_4$ to $C_{14}$ alkyl but are not simultaneously hydrogen, and X and Y can be alkali metal ions and/or ammonium ions. Preferably $R^5$, $R^6$ are linear or branched alkyl radicals having 6 to 18 C atoms or hydrogen, and more particularly having 6, 12, and 16 C atoms, with $R^5$ and $R^6$ not both simultaneously being hydrogen. X and Y are preferably sodium, potassium or ammonium ions, with sodium being particularly preferred. Particularly advantageous compounds are those in which X and Y are sodium, $R^5$ is a branched alkyl radical having 12 C atoms, and $R^6$ is hydrogen or $R^5$. Oftentimes use is made of technical mixtures which comprise a fraction of 50% to 90% by weight of the monoalkylated product, an example being Dowfax® 2A1 (trade mark of the Dow Chemical Company). Suitable emulsifiers are also found in Houben-Weyl, Methoden der organischen Chemie, volume 14/1, Makromolekulare Stoffe, Georg Thieme Verlag, Stuttgart, 1961, pages 192 to 208. Examples of emulsifier trade names include Dowfax® 2 A1, Emulan® NP 50, Dextrol®OC 50, Emulgator 825, Emulgator 825 S, Emulan® OG, Texapon® NSO, Nekanil® 904 S, Lumiten® I-RA, Lumiten® E 3065, Disponil® FES 77, Lutensol® AT 18, Steinapol® VSL, and Emulphor® NPS 25. Also suitable are copolymerizable emulsifiers which comprise a radically polymerizable, ethylenically unsaturated double bond, examples being reactive anionic emulsifiers such as Adeka® Resoap SR-10.

The emulsion polymerization takes place in general at 30 to 130° C., preferably 50 to 90° C. The polymerization medium may be composed either only of water or else of mixtures of water and water-miscible liquids such as methanol. It is preferred to use just water. The emulsion polymerization can be carried out either as a batch operation or in the form of a feed process, including staged or gradient procedures. Preference is given to the feed process, in which a portion of the polymerization batch is made the initial charge, heated to the polymerization temperature, and partially polymerized, and then the remainder of the polymerization batch, usually by way of two or more spatially separate feeds, of which one or more comprise the monomers in pure form or in emulsified form, is supplied continuously or else in stages.

The emulsion polymerization takes place preferably in a ramp regime. In this case the feeding of the monomers and optionally of the protective colloids as well takes place with the changing feed rate, the initial rate of the feed being slower than the final feed rate.

For example, at least 80 wt %, preferably 80 to 100 wt %, of the total amount of the protective colloid is run in during the emulsion polymerization in the feed process, and the monomer addition as well takes place in a feed process, with the feed rate rising over time—that is, the final rate of the monomer feed is higher than the initial rate. The feed rate here rises preferably continuously or incrementally in a number of steps, as for example in at least three or at least five steps. Conceivably the feed rate for the protective colloid also rises continuously or in a number of steps, as for example in at least three or at least five steps, incrementally. At the beginning of the polymerization, therefore, there is only very little protective colloid, or preferably none at all, in the initial charge. The addition of protective colloid preferably commences only after the polymerization has been commenced and at least 1 wt %, at least 2 wt %, or at least 5 wt % of the total monomer amount has already been added to the polymerization vessel. The addition of protective colloid takes place preferably continuously or incrementally and in parallel with the continuous or incremental addition of the remaining monomers.

Before the beginning of reaction, the protective colloid is more preferably located entirely in the initial charge. The neutralization of the acid groups of the protective colloid may take place with a suitable base (e.g., alkali metal hydroxide or ammonia) in retarded form, as for example 10 minutes, 20 minutes, or 30 minutes after the start of the polymerization reaction or after commencement of the monomer feed.

The polymerization preferably takes place such that not more than 10 wt % of the monomers used for forming the polymer are added, during the emulsion polymerization, at the initial rate of the monomer feed or at a feed rate which is lower than the final rate of the monomer feed. For the emulsion polymerization it is possible to use the customary and known auxiliaries, such as water-soluble initiators and chain transfer agents (CTAs), for example. Examples of water-soluble initiators for the emulsion polymerization are ammonium salts and alkali metal salts of peroxodisulfuric acid, e.g., sodium peroxodisulfate, hydrogen peroxide or organic peroxides, e.g., tert-butyl hydroperoxide. Also suitable are what are called reduction-oxidation (redox) initiator systems. The redox initiator systems are composed of at least one, usually inorganic, reducing agent and one organic or inorganic oxidizing agent. The oxidizing component comprises, for example, the initiators already specified above for the emulsion polymerization. The reducing components are, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and salts thereof, or ascorbic acid. The redox initiator systems may be used in the company of soluble metal compounds whose metallic component is able to exist in a plurality of valence states. Typical redox initiator systems are, for example, ascorbic acid/iron (II) sulfate/sodium peroxodisulfate, tert-butyl hydroperoxide/sodium disulfite, tert-butyl hydroperoxide/Na hydroxymethanesulfinate, or tert-butyl hydroperoxide/ascorbic acid. The individual components, the reducing component for example, may also be mixtures, an example being a mixture of the sodium salt of hydroxymethanesulfinic acid with sodium disulfite. The stated compounds are used usually in the form of aqueous solutions, with the lower concentration being determined by the amount of water that is acceptable in the dispersion, and the upper concentration by the solubility of the respective compound in water. Generally speaking, the concentration is 0.1 to 30 wt %, preferably 0.5 to 20 wt %, more preferably 1.0 to 10 wt %, based on the solution. The amount of the initiators is generally 0.1 to 10 wt %, preferably 0.2 to 5 wt %, based on the monomers to be polymerized. It is also possible for two or more different initiators to be used in the emulsion polymerization. For the removal of the residual monomers, it is usual to add initiator after the end of the actual emulsion polymerization as well.

In the polymerization it is possible to use CTAs, in amounts, for example, of 0 to 1 part by weight or of 0.05 to 0.5 part by weight, based on 100 parts by weight of the monomers to be polymerized, these CTAs reducing the molar mass. Suitable examples include compounds having a thiol group such as tert-butyl mercaptan, thioglycolic acid ethylalkyl esters, mercaptoethanol, mercaptopropyltrimethoxysilane or tert-dodecyl mercaptan. Additionally it is possible to use CTAs without a thiol group, such as terpinolene, for example. In one preferred embodiment the emulsion polymer is prepared using 0.05 to 0.5 part by weight, based on the monomer amount, of at least one CTA.

The invention also provides a method for producing cold-sealed packaging, in which a composition in the form of an aqueous polymer dispersion is made available and is applied to a packaging substrate, dried, and cold sealed with a second substrate, the polymer dispersion comprising at least one polymer in dispersion in water that is preparable by emulsion polymerization of radically polymerizable monomers in the presence of at least one polymeric protective colloid, the polymer having a calculated glass transition temperature in the range from −20 to +10° C. and the polymer being formed to an extent of 0.05 to 1 wt % of at least one monomer selected from the group consisting of (meth)acrylate monomers having a substituent of the formula

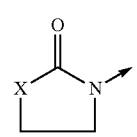

where X is $CH_2$, O, NH, or NR, and R is a C1 to C4 alkyl group.

The polymer dispersion of the invention is suitable for cold sealing two arbitrary substrates, the two substrates, at the points which are to be adhered, having been or being each coated with the polymer dispersion of the invention, and the two substrates, if desired with exertion of pressure, being contacted, the temperature in the coated composition being less than 40° C. (cold sealing; see above).

Substrates contemplated for bonding include any desired substrates, examples being substrates made of wood, metal, paper or plastic, which may be bonded to one another in any desired combination, at least one substrate preferably being a polymer film. For this purpose the substrates are coated with the composition of the invention.

Following application to a substrate and following drying, the polymer dispersion preferably forms an autoadhesive coating which is blocking-resistant at room temperature.

Coating may take place in a conventional manner, as for example by printing, more particularly by flexographic printing or by gravure printing (intaglio printing). Customary coat thicknesses (after drying) are, for example, 1 to 30 $g/m^2$, preferably 1 to 10 $g/m^2$ or 2 to 7 $g/m^2$. The polymer dispersion is applied preferably in an amount of 2 to 5 $g/m^2$, based on the solids content of the polymer dispersion, to each section of material that is to be sealed.

The composition of the invention is suitable especially for producing packaging. Packaging contemplated is that composed of any desired materials, such as of paper or, preferably, of plastic, for example. Examples cited may include packaging made from polymer films, including, if desired, metallized polymer films, e.g., of polyethylene, polypropylene, PVC, polyester and/or polyacetate. Preferred packaging substrates are selected from polymer carrier films made of polyethylene and oriented polypropylene.

Especially suitable for producing packaging is a double-sidedly coated carrier, the carrier having on one side (referred to below as face) an outer layer of the composition of the invention, and having on the other side (referred to below as reverse) an outer release coating. The carrier may be composed, for example, of one of the abovementioned polymer films, or metallized polymer films, mention being made in particular of films of oriented polypropylene, polyethylene, preferably high-density polyethylene, or polyethylene terephthalate. The polymer films may also have been corona-pretreated. The composition of the invention may be coated directly onto the face of the carrier, although between the carrier and the composition of the invention there may also be other layers, examples being primer layers, barrier layers or colored or monochrome printing ink layers, although printing ink layers are preferably located on the reverse of the carrier. It is essential that the layer of the composition of the invention be located on the outside.

The release coating may be of any desired material, and may be a polymer film, e.g., a film of oriented polypropylene, which is laminated on or coextruded, or a liquid varnish, such as a polyamide varnish, for example, which is applied and filmed; it is essential that the layer of adhesive applied to the face of the carrier (in the present case, the composition of the invention) does not adhere to the release coating (blocking resistance). The carrier is generally rolled up and later processed from the roll. In the course of rolling, the face and the reverse of the carrier come into direct contact. Adhesion of the face to the reverse would make the carrier unusable. Between the release coating and the carrier there may be further layers; those contemplated include, in turn, layers of a primer which improves the adhesion, and printing ink layers. Another function of the outer release coating is to protect the lower layers, more particularly the printing ink layer, from external exposures.

The polymer carrier film consists preferably of polyethylene or of oriented polypropylene, is coated on one side, in accordance with the invention, with the composition in the form of an aqueous polymer dispersion, and on the other side is coated with a release coating, preferably based on polyamide.

Preferred carriers have the following construction, the sequence of the layers corresponds to the spatial arrangement:

adhesive layer (polymer dispersion for inventive use)
carrier
optional primer layer
optional printing ink layer
release coating.

The double-sidedly coated carrier is used more particularly for producing packaging, for which purpose it is preferably bonded to itself by cold sealing, with the faces coated with the outer composition of the invention being brought into contact in each case. It is essential here that both carriers to be bonded are coated with the composition of the invention at the points that are to be bonded and that form the subsequent sealed seam. The packaging is sealed together by cold sealing of the adhesive layer as soon as the packaged contents have been introduced. The packaging is suitable especially for food.

When the pack is being produced, the composition (polymer dispersion) used for the cold seal is applied preferably in an amount of 2 to 5 $g/m^2$ (based on solids) to each closure section.

The closure forces of the pack of the invention are preferably such that the initial opening force is at least 2 N/15 mm, preferably 2 to 7 N/15 mm, measured in accordance with the method described in the examples.

Also provided by the invention is a coated polymer film, where a polymer carrier film is coated at least partly, i.e., at least at the areas forming the subsequent sealed seam, with a composition of the invention. The polymer film of the invention preferably has a first side and a second side, the first side as outer layer being coated at least partly with a composition of the invention, and the second side having as outer layer a release coating. In one embodiment the polymer carrier film of the coated polymer film of the invention is composed of polyethylene or oriented polypropylene, and the release coating is formed on the basis of polyamide.

The invention also provides packaging produced by the method of the invention as described herein.

The invention also provides for the use of the substrates coated in accordance with the invention, more particularly of polymer films coated in accordance with the invention, for producing and for cold sealing packaging, especially film packaging for foods.

EXAMPLES

Unless the context dictates otherwise, the figures in percent always denote percent by weight. A content datum relates to the content in aqueous solution or dispersion.

The ingredients used were as follows:

Oppalyte® 33MW247: film recommended for cold-seal applications, made of surface-treated, biaxially oriented polypropylene, from Exxon Mobil Corp.

Treofan® SHD40: film recommended for cold-seal applications, made of oriented polypropylene, from Treofan GmbH & Co. KG Gecko® Coldseal Release Varnish 70 GL 282547: polyamide release varnish, solvent-based, from Huber Group nBA n-butyl acrylate AA acrylic acid
EA ethyl acrylate
UMA ureidoethyl methacrylate
MMA methyl methacrylate
VAc vinyl acetate
EHTG 2-ethylhexyl thioglycolate Cold-Seal Testing
Coating with Polyamide Release Varnish A 0.07 mm wire applicator is used to apply Gecko® Coldseal Release Varnish 70 GL 282547 to the pretreated side of the OPP film SHD40, and the applied varnish is dried with hot air for 10 seconds. Release varnish application rate: about 1.0 g/m².

Coating of the OPP Film

With the bar applicator, the adhesive (polymer dispersion) is applied to the pretreated side of the OPP film Oppalyte® 33MW247 and dried at 70° C. for 1 minute. The coated film is lined with an OPP film coated with release varnish.

Sealed Seam Strength (SSS)

Strips 15 mm wide are cut from the coated film and in pairs sealed to one another (adhesive to adhesive) on the sealing device for 0.5 second with 200 N (1.4 bar). 30 seconds after sealing has taken place, the peel strengths in N/15 mm are ascertained at a peel speed of 50 mm/min.

Sealed Seam Strength (SSS) after Pressure Storage

The coated film is placed against the release-varnish-coated side of an SHD40 OPP film, and an area measuring 10 cm times 10 cm is loaded with 10 tonnes for one day. Thereafter strips 15 mm wide are cut from the coated film and sealed to one another in pairs (adhesive to adhesive) on the sealing device for 0.5 second with 200 N (1.4 bar). 30 seconds after sealing has taken place, the peel strengths in N/15 mm are ascertained at a peel speed of 50 mm/min.

Blocking Test

The coated film is placed against the release-varnish-coated side of an SHD40 OPP film, and a circular section having a diameter of 10 cm is loaded with 10 tonnes for 1 day. Thereafter the peel strengths of strips 25 mm wide are determined in N/25 mm, with a peel speed of 800 mm/min.

All tests take place at room temperature (20° C.).

TABLE 1

Composition of the aqueous polymer dispersions

| Example | Protective colloid | Polymer | Solids content [%] | Tg [° C.][1] |
|---|---|---|---|---|
| I1 | 65 nBA/35 AA | 95 EA, 0.25 UMA, 0.75 MMA, 4 VAc, 0.3 EHTG | 56.6 | −10 |
| I2 | 65 nBA/35 AA | 95 EA, 0.25 UMA, 0.75 MMA, 4 VAc, 0.3 EHTG | 56.6 | −10 |
| I3 | 65 nBA/35 AA | 94 EA, 0.25 UMA, 0.75 MMA, 5 VAc, 0.3 EHTG | 58 | −10 |
| I4 | 65 nBA/35 AA | 95 EA, 0.25 UMA, 0.75 MMA, 4 VAc, 0.3 EHTG | 58.5 | −10 |
| I5 | 65 nBA/35 AA | 99 EA, 0.125 UMA, 0.375 MMA, 0.5 VAc, 0.3 EHTG | 56.7 | −12 |
| I6 | 65 nBA/35 AA | 99 EA, 0.25 UMA, 0.75 MMA, 0.3 EHTG | 56.8 | −12 |
| C1 | 65 nBA/35 AA | 100 EA, 0.3 EHTG | 56.5 | −13 |
| C2 | 65 nBA/35 AA | 95 EA, 1 MMA, 4 VAc, 0.3 EHTG | 58 | −10 |
| C3 | 65 nBA/35 AA | 96 EA, 4 VAc, 0.3 EHTG | 54.9 | −11 |
| C4 | 65 nBA/35 AA | 94 EA, 6 VAc, 0.3 EHTG | 56.4 | −10 |

TABLE 1-continued

Composition of the aqueous polymer dispersions

| Example | Protective colloid | Polymer | Solids content [%] | Tg [° C.][1] |
|---|---|---|---|---|
| C5 | 65 nBA/35 AA | 94 EA, 1 MMA, 5 VAc, 0.3 EHTG | 55.6 | −10 |
| C6 | 65 nBA/35 AA | 95 EA, 1 UMA, 3 MMA, 1 VAc, 0.3 EHTG | 56.7 | −9 |

[1] Polymer glass transition temperature as calculated using the Fox equation

TABLE 2

Results of the cold seal tests

| Example | Sealed seam strength [N/15 mm] | Sealed seam strength, after pressure storage [N/15 mm] |
|---|---|---|
| I1 | 6.5 | 5.7 |
| I2 | 6.7 | 5.8 |
| I3 | 6.6 | 4.9 |
| I4 | 7.0 | 6.3 |
| I5 | 6.6 | 4.6 |
| I6 | 6.4 | 2.8 |
| C1 | 4.3 | 2.4 |
| C2 | 4.4 | 3.2 |
| C3 | 4.5 | 3.4 |
| C4 | 4.9 | 4.0 |
| C5 | 4.5 | 4.1 |
| C6 | 1.8 | 2.0 |

The inventive compositions I1 to I6 are notable relative to the comparative compositions C1 to C6 for a greater sealed seam strength of more than 5 N/15 mm.

In the blocking test, all inventive and comparative examples exhibit a peel strength with respect to a polyamide release coating of <0.1 N/25 mm.

The invention claimed is:

1. A method for producing cold-sealed packaging, the method comprising:
applying an aqueous polymer dispersion composition to a packaging substrate to form a coating on the packaging substrate,
drying the coating, and
cold sealing the packaging substrate,
wherein
the polymer dispersion comprises a polymer which is present in dispersion in water and is obtained by emulsion polymerization of radically polymerizable monomers in the presence of at least one polymeric protective colloid,
the polymer has a calculated glass transition temperature of from −20 to +10° C., and
the polymer is formed to an extent of 0.05 to 1 wt % of at least one methacrylate monomer having a substituent of an formula

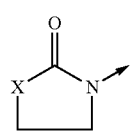

where X is $CH_2$, O, NH or NR, and R is a C1 to C4 alkyl group;

wherein the extend of the at least one methacrylate monomer is based on the total amount of monomers used for preparing the polymer.

2. The method according to claim 1, wherein the packaging substrate is a polymer carrier film comprising at least one of polyethylene and oriented polypropylene.

3. The method according to claim 1, wherein the polymer carrier film consists of polyethylene or of oriented polypropylene, and is coated on one side with the aqueous polymer dispersion composition, and on the other side with a release coating.

4. The method according to claim 1, wherein the cold sealing takes place at a temperature of below 40° C. and with application of pressure.

5. The method according to claim 1, wherein the polymer dispersion is applied in an amount of 2 to 5 g/m², based on a solid content of the polymer dispersion, to each section of material that is to be sealed.

6. The method according to claim 1, wherein the polymer comprises, in polymerized form, at least 60 wt % of at least one principal monomer selected from the group consisting of a C1 to C20 alkyl methacrylate, a vinyl ester of a carboxylic acid comprising up to 20 C atoms, a vinylaromatic comprising up to 20 C atoms, an ethylenically unsaturated nitrile, a vinyl halide, a vinyl ether of an alcohol comprising 1 to 10 C atoms, and an aliphatic hydrocarbon comprising 2 to 8 C atoms and one or two double bonds.

7. The method according to claim 1, wherein the polymer comprises, in polymerized form, at least 60 wt % of at least one $C_1$ to $C_{20}$ alkyl methacrylate, a mixture thereof, or a mixture thereof with styrene and/or vinyl acetate.

8. The method according to claim 1, wherein the polymer comprises, in polymerized form,
(a) 90 to 99 wt % of at least one first monomer selected from the group consisting of n-butyl acrylate and ethyl acrylate,
(b) 0.1 to 9.9 wt % of at least one second monomer selected from the group consisting of methyl acrylate, methyl methacrylate, vinyl acetate, and styrene, and
(c) 0.05 to 0.95 wt % of ureido methacrylate.

9. The method according to claim 1, wherein the polymer is free from acid groups.

10. The method according to claim 1, wherein the at least one methacrylate monomer is ureidoethyl methacrylate.

11. The method according to claim 1, wherein the cold sealing is a cold sealing of packaging, and the cold-seal packaging has an initial opening force of at least 2 N/15 mm.

12. The method according to claim 1, wherein the protective colloid
(i) is used in an amount of 7 to 30 parts by weight, based on 100 parts by weight of the polymerizable monomers,
(ii) comprises at least 40 wt % of at least one principal monomer selected from the group consisting of a C1 to C20 alkyl methacrylate, a vinyl ester of a carboxylic acid comprising up to 20 C atoms, a vinylaromatic comprising up to 20 C atoms, an ethylenically unsaturated nitrile, a vinyl halide, a vinyl ether of an alcohol comprising 1 to 10 C atoms, and an aliphatic hydrocarbon comprising 2 to 8 C atoms and one or two double bonds,
(iii) comprises at least 15 wt % of an ethylenically unsaturated acid monomer, and
(iv) has a number-average molecular weight of 1000 to 10 000.

13. The method according to claim 1, wherein the protective colloid comprises 50 to 80 wt % of C2 to C10 alkyl methacrylate and 20 to 50 wt % of methacrylic acid.

14. The method according to claim 1, wherein the polymer is prepared using at least one chain transfer agent.

15. The method according to claim 1, wherein the polymer is formed to an extent of 100% from at least one monomer selected from the group consisting of an acrylic ester, a methacrylic ester, a vinyl ester, styrene, and a ureido methacrylate, and the protective colloid
(i) is used in an amount of 7 to 30 wt %, based on an amount of the polymer,
(ii) comprises at least 40 wt % of at least one principal monomer selected from the group consisting of a C1 to C20 alkyl methacrylate, styrene, and alpha-methylstyrene,
(iii) comprises at least 15 wt % of an ethylenically unsaturated acid monomer, and
(iv) has a number-average molecular weight of 1000 to 10 000.

16. The method according to claim 1, wherein
the polymer dispersion forms a coating which has an autoadhesion after cold sealing at 1.4 bar and 20° C. of at least 2 N/15 mm, and a block-resistance after drying with respect to a polyamide surface after loading of a circular surface with a diameter of 10 cm with 10 tonnes for one day at 20° C. of not more than 0.1 N/25 mm.

17. The method according to claim 1, wherein the emulsion polymerization takes place in the presence of the protective colloid without a nonpolymeric emulsifier.

18. The method according to claim 1, wherein the emulsion polymerization takes place in a ramp regime.

19. The method according to claim 1, wherein the cold sealing is a cold sealing of packaging.

20. The method according to any claim 1, wherein the polymer dispersion, following application to a substrate and drying, forms a coating which at room temperature is blocking-resistant and is autoadhesive.

21. The method according to claim 20, wherein the substrate is a polymer film.

* * * * *